June 21, 1966      W. C. PATTERSON      3,256,862
BUNK TYPE DUMP FEEDER
Filed May 8, 1964
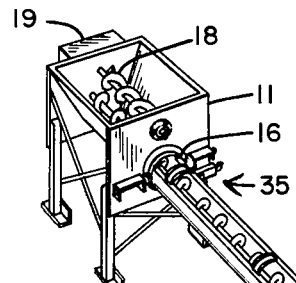
Fig. 1
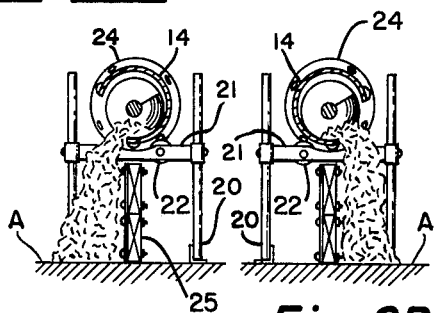
Fig. 2A
Fig. 2B
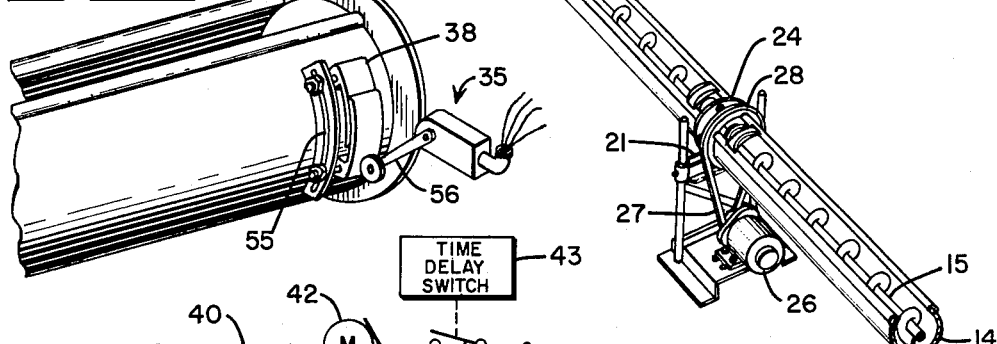
Fig. 3
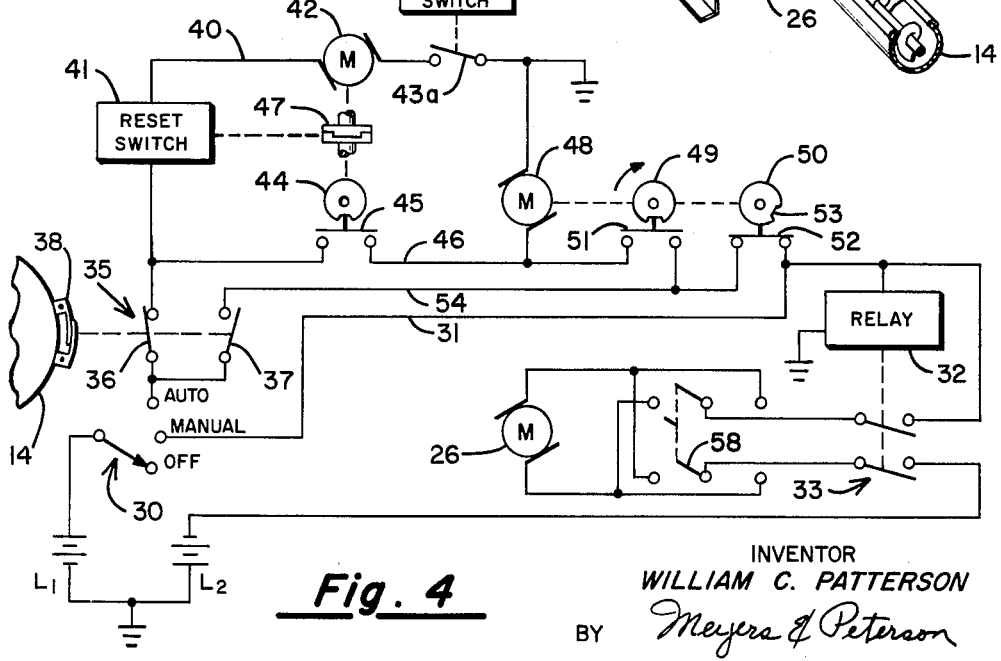
Fig. 4
INVENTOR
WILLIAM C. PATTERSON
BY   Meyers & Peterson
ATTORNEYS United States Patent Office 3,256,862
Patented June 21, 1966

3,256,862
BUNK TYPE DUMP FEEDER
William C. Patterson, Omaha, Nebr., assignor to Nebraska Engineering Company, Omaha, Nebr., a corporation of Nebraska
Filed May 8, 1964, Ser. No. 365,911
5 Claims. (Cl. 119—51.11)

The present invention relates generally to apparatus for feeding livestock, and more particularly to a system for automatically controlling the dumping action of a bunk feeder.

As indicated above, the present invention is particularly adapted for use in connection with feeding cattle or the like. In the handling of livestock, and feed for the stock, it is particularly desirable and advantageous to be able to distribute the feed requirements along an extended path or the like within a particular area where the cattle or other stock are confined or located. Apparatus of this type is commonly called a "bunk feeder." A technique for distributing feed in this manner is through the use of an auger maintained within a tubular housing, the tubular housing being pivotally rotatable about its central axis and having a longitudinal slot or opening through which the feed is discharged. In this fashion, the auger will transport or move material within the tubular housing from a hopper located at one end thereof, and extend or distribubte the feed longitudinally along the confines of the tubular housing. When the housing is sufficiently full, the feed being distributed therealong as desired, tubular unit is rotated about its central axis and the feed is thereby dumped through the slot or opening for consumption by the stock.

Because of the principle of operation, the feed will not be separated or form a gradient from coarse to fine along the path of the hopper, and the feed in the tubular housing will accordingly always be uniform. In addition, the housing may be arranged to pivot axially in either of two arcuate directions, thereby making it possible to sequentially feed a different ration to the same or opposite sides of a divided bunk without the requirement of a diverter or flipper board to be disposed between the bunks. In this event, it is only generally necessary that the bunks be physically divided. (There is accordingly no need for flipper boards or the like in order to accomplish the feeding operation.) This type of apparatus provides a highly versatile feeder inasmuch as it is possible to fill as great or as small a length of the tubular housing as is desired.

In accordance with the present invention, a cylindrical tube is provided which utilizes a coaxially disposed auger or screw which is fed substantially continuously from a main hopper or bin station disposed adjacent the end of the tube and arranged to supply feed to the auger. The auger is energized for a predetermined period of time, during which time the feed moves into the main hopper and then to the tube, after which time the control circuit of the present invention actuates the tube dumping means, and the loaded tube is then rotated about its central axis to empty or discharge its contents. While the tube is being emptied, there is a dwell period or an interruption in the rotating cycle, after which the circuit again actuates the motor and continues to drive the tube. The tube is driven back to a normal or stop position. The control circuit utilizes a timer system having contact means associated therewith, these contact means being adapted to periodically energize, de-energize and then re-energize the tube dumping motor. This cycling advances the cylindrical feed tube from a loading or charging position to an unloading or discharge position, retains the tube in the unloading position for a predetermined period of dwell, and thence returns the tube to the normal or ordinary charging position. The circuitry is adapted to cycle continuously in this fashion, a re-setting relay or its equivalent being utilized to limit the operation to one cycle at a time. In addition, means are provided in connection with the timer mechanism of the tube dumping means to permit operation of the auger for an initial predetermined period of time prior to the time that the dumping operation commences. Thus, with this feature, the operator may initially be filling the main hopper, while actuating the auger to permit charging of the cylindrical tube to a desired axial extent, and thereafter the dumping mechanism will unload the feed from the cylindrical tube in substantially evenly distributed fashion along the predetermined feeding area in the bunk.

In the bunk feeder of the present invention, the screw or auger is not exposed except at the top of the cylindrical tube, and therefore there is no tendency for the cattle to insert their tongues into the tube at a point where feed may be flowing out and the screw or auger is disposed close to the tube opening. In this regard, a clearance area is available along the entire area where the screw or auger is disposed adjacent to the opening. Since the feed is distributed along the entire length of the cylindrical tube, there is no tendency for the cattle to crowd in one local area of the feed bunk. As long as the main hopper is being provided with a supply of feed at a constant rate, distribution along the bunk is completely uniform, and hence no local area receives a greater quantity of feed than another local area. It should be noted that the height of feed in the cylindrical tube is determined by how rapidly feed is being supplied to the hopper since the auger pulls the feed out at whatever rate it is being introduced into the hopper, consistant with the capacity of the auger.

Therefore, it is an object of the present invention to provide an elongated loading feed tube which is cyclically operated to distribute feed along a predetermined extent of the axial length of the tube, the tube being adapted to be energized periodically to unload or dump the material contained or retained within the tube onto a predetermined feed area or location.

It is a further object of the present invention to provide an improved apparatus and control for feeding livestock, the apparatus being specifically adapted to periodically actuate the mechanism to initially move feed axially along a tubular housing, and thereafter dump the feed from the housing onto a bunk feed area A adjacent thereto, the invention envisaging the rotation of the tube either in a clockwise or counter-clockwise direction, to a dumping position, with the provision of an appropriate dwell period during the dumping portion of the entire cycle of operation.

It is yet a further object of the present invention to provide an improved technique and apparatus for rotatably moving a feed tube from one arcuate position to another, in either a clockwise or counter-clockwise direction, each of the rotational sequences including an initial drive period from the charging position to the unloading position, with a dwell period occurring while the tube is in the unloading position, and a second or continuing rotational sequence to return the hopper to the upright or charging position.

Other and further objects of the present invention will become apparent to those skilled in the art upon a study of the following specification, appended claims, and accompanying drawings wherein:

FIGURE 1 is a perspective view of a loading bin together with a cylindrical feed tube having an auger for loading thereof, the tube being shown partially broken away, and wherein the tube is rotatable axially about its longitudinal axis;

FIGURES 2A and 2B are vertical sectional views taken through a segment of the rotatable feed tube, and showing the tube in two different angularly tipped, or unloading positions, each being angularly spaced from the vertical charging position;

FIGURE 3 is a detail perspective view showing the arrangement of a switching mechanism which is controllably actuated by cam surfaces secured to the surface of the rotatable tube; and FIGURE 4 is a schematic diagram of a control circuit arranged in accordance with the present invention.

In accordance with the preferred modification of the present invention the feed distribution apparatus generally designated 10 includes a bin storage chamber or main hopper 11 together with an elongated distributing mechanism or feed tube generally designated 12. Any suitable conveyor means (not shown) may be utilized to fill the hopper 11. The feed tube 12 comprises a circular segment or open tube type rotatable chamber area 14 together with a coaxially disposed auger or screw 15. The tube is preferably open along the top for about 30 degrees to about 45 degrees of arc. The distributor mechanism or tube 12 is in communication with the loading hopper or bin 11 at the junction area 16, the bin or hopper 11 having an open top for receiving feed therein, the hopper 11 further being provided with a mixing auger or the like 18. Suitable means such as a motor or the like 19 are provided to deliver rotary motion to the individual auger members 15 and 18. For vertical support, suitable struts or columns 20—20, mounted over the area, are provided along with the cross members 21—21 for horizontal support. In order to accommodate axial rotation of the rotatable tube 12, rollers 22—22 are provided, these rollers making mutual tangential contact with the circumferential ring members 24—24. A suitable gland means or the like is provided at the juncture area 16 for providing sealing contact between the hopper 11 and the rotatable tube 12.

The rotatable tube member 12 has an arcuate open segment which is normally disposed at the top thereof. When the unit is in the position illustrated FIGURE 1, the charge may be continuously transferred from the hopper 11 into the confines of the distributing tube 12 and moved axially therealong. With attention directed to FIGURE 2, the disposition of the apparatus shown in the FIGURE 2A shows one arcuate or rotational dumping position, the disposition shown at the right in 2B being a second arcuate or rotational dumping position. When directional actuating means are available, the unit may accordingly be dumped in either of two directions, and it is preferable that a bunk divider or the like be interposed to define or separate the individual feed areas such as the vertical bunk divider member 25. As indicated, the tube 12 is rotatable about its axis, and the unit, after leaving the unloading or dump position at the end of the dwell period returns to the upright position shown in FIGURE 1 of the drawing. A motor means 26 having an endless belt such as the chain 27, and driving a sprocket 28 which is secured to the circumference of the tube member 12 is utilized as the mechanical means for rotating the tube through the various angular dispositions.

In a system wherein directional actuating means are available, it is particularly preferable that the distributing mechanism such as the distributing mechanism 12 include a certain period of dwell in its rotary unloading excursion. This dwell time assures that the feed or other particulate matter which is being handled by the tube is deposited or unloaded entirely along one side of the bunk area. Thus, in a stock feeding operation, the specific ration being provided to a group of livestock will be controllable both with regard to quantity and to type of ration being fed.

Attention is now directed to FIGURE 4 of the drawing wherein the schematic diagram is illustrated showing the control circuit which is utilized to energize the motor means 26 for rotating the distributing mechanism 12 through its various angular positions. In this connection briefly, the control circuit includes a timer means or timer motors and their associated cam actuated switch contacts, together with a relay operated or controlled by certain of these contacts. In addition, the circuit includes a cam actuated switch having a pair of contacts, the switch being operated by a cam surface attached to and integral with the outer surface of the distribution tube 12. A delay switch may be employed to delay actuation of the control circuit until a certain predetermined time has elapsed to accommodate operation of the hopper filling equipment. In this regard, the time delay may be actuated simultaneously with the auger motor 19, and after this predetermined period of time has elapsed allowing for the filling of the hopper 11 to commence the dumping unit will be set into its operation cycle. Time delay switches of this type are, of course, commercially available.

Turning now to the control circuit in particular, power is supplied to the unit through the mains L1 and L2, the selector switch 30 being utilized to control the disposition of the unit through various settings including an automatic operating cycle and a manual operating cycle. If a manual cycle is selected or employed, the current is supplied to the motor 26 along the conductor 31, the current actuating the relay 32 which closes the contacts generally designated 33 and supplies running current to the motor 26. This operation is, obviously, straightforward and is utilized as a convenience in the overall control circuitry. No automatic dwell time is provided here, however.

In the automatic operating position, current is supplied to the relay 32 and to the motor 26 through a different path. In this regard, the switch means generally designated 35 includes a pair of contact elements 36 and 37, 36 being a normally open contact, 37 being a normally closed contact. A cam surface shown at 38 and integral with the rotatable distributing tube 12 is used to control the immediate disposition of the contacts 36 and 37. In the rest or loading position, such as shown at FIGURE 3, the switch means generally designated 35 has its contacts in the actuated position; thus, the normally open contact 36 will be closed, and the normally closed contact 37 will be open.

Referring now to the circuit controlled by the contact 36, the conductor 40 has a re-set switch mechanism 41 arranged in series therealong, together with the re-set timer motor 42, and time delay switch means at 43. Timer motor 42 is normally integral with the re-set switch 41, and has an actuating bar and solenoid represented by cam 44 for controlling disposition of a contact as at 45, the contact 45 controlling current flow along conductor 46. Conductor 46 is connected to a second timer motor 48. The timer 48 includes a pair of cams 49 and 50 for controlling the disposition of contacts 51 and 52, the contact 52 being disposed in circuit with the conductor means 54 which includes the normally closed contact 37. Contact 51 bridges the conductors 46 and 54.

In automatic operation, therefore, the distribution tube mechanism 12 will be at its loading or charge receiving position such as is illustrated in FIGURE 1, the switch means 35 being arranged in surface contacting relationship with the cam means 38; thus maintaining the switch 36 in closed position and the switch 37 in open position. The selector is turned to "automatic," and the re-set switch 41 closes to start the cycle, this switch preferably being designed so as to maintain the contacts normally closed whenever current flow in the circuit has been established, interrupted, and then re-established. Mechanisms of this type are commercially available, such as from the Paragon Electric Company, Inc. of Two Rivers, Wisconsin under their code number 500–102–0. The time delay switch 43 is also normally closed, and when the contacts associated therewith, that is, contacts 43a are closed, a circuit is established all along conductor 40. Timer motor 42 is actuated and after a predetermined re-set time and upon initiation of rotation of the cam 44, the contacts 45 associated therewith are immediately closed. This energizes the second timer motor 48, and cams 49 and 50 are also actuated. The contact 52 is closed at the initiation of the cycle of timer motor 48 so that as soon as the contacts 45 and 51 close, the circuit to relay 32 is established along a line including conductor 46 through contacts 51 and 52. Contact 51 is closed shortly after motor 48 is actuated. This arrangement supplies current to the tube dump motor 26 which will commence axial rotation of the tube 12. As the tube 12 starts to rotate, the normally open contacts 36 are permitted to open due to the action of the cam follower 56 (FIGURE 3) leaving the cam surface 38. However, as the contacts 36 open, the normally closed contacts 37 are closed and thus a continuous circuit is available to both timer motors 42 and 48, as well as to the relay 32 and the motor 26. Thus, continuity is maintained while the tube 12 turns. However, when the cam notch or gap 53 in cam 50 reaches the cam follower surface of the associated contact means 52, the associated contact means 52 are opened and current flow is interrupted to the relay 32. This interrupts rotation of the tube 12 but at the same time permits the timer motors 42 and 48 to continue functioning. The period of time that the contact 52 remains open is the dwell period of the unit during the dumping operation. This dwell is preferably limited to a period which is as short as possible, and is normally about 1 to 2 seconds in duration. This insures complete unloading of the tube while maintaining the quantity of excess feed at the forward portion at a minimum thereof. Ultimately, the lobe or high portion adjacent notch 53 of the cam 50 closes the associated contacts 52 so that the tube motor 26 is again energized, the rotation being sufficient to bring the tube opening or slot to its uppermost or original charging position. The lobe areas are adjustable, thus the dwell period may be established as the operation dictates.

When the original or charging position has been reached in the course of the cycle, the cam surface 38 is in engagement with the limit switch mechanism 35, and the contacts 37 are again held open. At the same time, the contacts 36 are closed so as to condition the unit for a subsequent cycle. Normally, about six or more dumps or cycles are needed to feed a group of cattle. Other livestock may have different requirements.

When the shaft of timer 48 has made one complete revolution, cam 49 opens its switch 51, thus interrupting flow of current to the timer 48 as well as to the timer 42 and the switch 41. This must occur before the tube 12 has completed its complete dumping cycle, while the contacts of the switch element 35 are in their normal positions. Interruption of current to the re-setting mechanism 41 conditions the assembly to commence running when current is again supplied through the contacts 36.

Particular attention is now directed to the cam surface 38, as shown in detail in FIGURE 3. It will be observed that the tube 12 is not in a vertical disposition, that is, the longitudinal opening is displaced somewhat from the vertical. This arrangement is utilized in order to compensate for the throw of the auger; hence, a modest tilting is utilized in order to compensate for this unequal distribution of feed within the confines of the tiltable distribution tube 12 and to assure complete unloading, regardless of the direction of the dumping. Normally, the divider boards should be off-set to equalize the distribution of feed relative to the throw of the auger. Of course, various angular adjustments may be made on the cam surface 38, the precise tilting being generally about 10 degrees, although for certain coarse feeds, or for certain fine feeds, this angle of throw may vary so that the cam surface is preferably made adjustable about the slotted flange carrier member 55.

Reference is made now to the circuit of FIGURE 4, and specifically to the double pole-double throw switch element 58. This switching system may be utilized in order to reverse the direction of rotation of the tube 12 in order to permit dumping on one side or the other of the barrier plates 25. Accordingly, the cam surface 38 will be adjusted in order to accomplish unloading in either direction and also compensate for the throw of the auger in the two directions.

In an actual operation situation, the unit is set up with a quantity of feed being delivered into the hopper 11 and switch 30 is placed in "auto" or automatic operation. The portion of the distribution tube 12 which is filled or charged with feed is determined on the basis of time, and is controlled by the re-set switch 41 in conjunction with motor 42 and clutch 47. The auger motor 19 is run for this minimum period of time prior to initiation of a dumping operation. The motor 26 is energized after expiration of the re-set timer starting cycle, and the tube 12 commences rotation in an arcuate direction determined by the setting of the double pole-double throw switch 58, the directional rotation continuing until the notch 53 in the cam 50 is reached. While the cam follower is within the notch area 53, the tube dump motor 26 is de-energized, this time being employed to permit the material contained therein to be completely discharged from the tube 12. At this time, the auger may or may not be continuing to run, however, for efficient dumping, it is normally preferred that the auger continue to run. The dwell period ceases when the lobe area of the notch 53 again urges the cam follower into its closed position, and the tube dump mechanism then continues to rotate until the hopper is back in its charging position.

In the synchronization of the individual timer elements and their motors 42 and 48, it will be appreciated that timer 42 will open contact 45 at the time that timer 48 completes its cycle by opening contacts 51. When electrical energy is initially supplied to the motor 42, the means supplying current to the timer motor 48, such as, for example, normally open contact 45, remains open until closed by means of an actuator bar and spring arrangement. The re-set mechanism including the timer motor 42 includes an intermittent or timed system represented by the clutch arrangement at 47 which is used to mechanically connect the timer motor to the actuator bar represented by cam 44. Clutch 47 is initially engaged and when the predetermined re-set time has expired, the contact 45 is closed, and the timing mechanism including timer motor 42 continues to function throughout its cycle until contact 45 is reopened. This occurs when timer 48 completes its cycle. Thereafter, the timer motor 42 is deprived of additional electrical energy. When current is again supplied to the timer motor 42 through contact 35 and re-set switch 41, the entire cycle is resumed. In the mechanical linkage between re-set 41 and clutch 47, a solenoid is preferably employed to convert a signal from the re-set switch 41 to a mechanical motion for disengaging the clutch 47. This establishes current flow as required to the relay 32 and ultimately through contact 33 to the motor 26. When the cam surface 38 is in contact with the cam follower arm 56, the normally closed contacts 37 will again be opened, and the normally open contacts 36 will again be closed. It will be appreciated that the opening and closing of contacts 36 and 37 occur simultaneously in order that the normally closed contacts 37 be permitted to resume their normally closed position prior to the time that current flow is actually interrupted by the opening of the normally open contacts 36. Since current flow to re-set switch 41 has been established, interrupted, and now re-established by closing of contact 36, the circuit is prepared or conditioned for another cycle.

The time delay switch 43 may be set for various periods of time, such as for example, from 5 seconds to 180 seconds or more depending upon the timing for the length of travel required for the feed which is being delivered to the hopper 11.

It is possible to utilize the apparatus of the present invention to feed different quantities of various feed rations to bunk areas for four or more lots of stock on various sides of the divider 25. In this connection, assume that a 200 foot tube hopper such as the tube hopper 14 is split into two 100 foot units, these units turning independently of one another with each of the 100 foot units being provided with its own tube turning mechanism. If it is desired to feed a certain ration, such as a ration A to a certain lot of stock on the right side of the bunk, and nearest the hopper, such as, for example, the lot being fed in FIGURE 2B, the double pole-double throw switch 58 would be turned to cause rotation of the mechanism to the "right." The auger would be started and at the time the feed ration reached a predetermined point on the first 100 foot section, for example, the midpoint of the tube mechanism, the first 100 foot section of the distribution tube would commence rotation and the stock would be fed, as desired. In order to feed cattle located to the left of the divider 25, such as in FIGURE 2A, the operation is repeated as indicated herein above, the only difference being that the switching mechanism 58 is turned in the opposite direction. If it is desired to feed the cattle or other stock located beyond the midpoint of the tube hopper, the auger is started and when the leading face of the feed has reached a desired point in the second 100 foot section, a second and independent tube dump mechanism is caused to discharge the contents contained in the second 100 foot section in the desired direction, this being accomplished by the separate control arranged in connection therewith. Accordingly, the feed is distributed over the feed area in a uniform and controllable rate.

It will be appreciated that the specific example set forth herein is provided for purposes of illustration only, and there is no intent of limiting the scope of the invention to this specific embodiment alone. Those skilled in the art may depart from this embodiment without actually departing from the spirit and scope of the present invention.

What is claimed:

1. Dump type bunk feeder means comprising a cylindrical feed tube having an outer surface with a longitudinal opening extending therealong, the tube having a normal charge-receiving position wherein said longitudinal opening is disposed along the top thereof, an auger disposed coaxially with said feed tube, drive means for rotating said auger within said feed tube for carrying feed axially therealong, motor means for rotating said feed tube from said charge-receiving position to a charge-dumping position where the feed is delivered to a bunk area, a timer motor, cam means rotatable by said timer motor, switch means actuated by said cam means, and means in circuit with said switch means for supplying power to said motor means to cause rotation thereof, said cam having means for normally closing said switch means to energize said motor means until said tube reaches its charge-dumping position and having a dwell portion for causing said switch means to open to stop said motor means at the charge-dumping position of said tube and to reclose said switch means after a desired dwell period has elapsed so as to cause said motor means then to be operated to return said tube to its charge-receiving position.

2. Dump feeder means as defined in claim 1 being particularly characterized in that said control means includes re-set means for maintaining said feed tube in said charge-receiving position for a predetermined period of time after initiation of said auger drive means.

3. The dump feeder means as defined in claim 1 being particularly characterized in that said control means includes limit switch means operated by said feed tube for stopping said motor when said feed tube reaches its charge-receiving position, said feed tube carrying cam means for actuating said limit switch means, said cam means being angularly displaced from said longitudinal opening so that said longitudinal opening is stopped at a slight angle from the vertical when said feed tube is in said normal charge-receiving position.

4. Feeding apparatus comprising a rotatable tube having an opening extending longitudinally thereof and having a normal charge-receiving position, motor means for rotating said tube from said charge-receiving position to a charge-dumping position, first cam means mounted on said tube so as to be rotatable therewith, said cam means being in a predetermined angular position when said tube is in its charge-receiving position, a first timer motor, first switch means actuatable into closed position for energizing said first timer motor when said first cam means is in its predetermined position and open when said cam means has been shifted from its predetermined position by rotation of said tube, a second timer motor, second cam means rotatable by said first timer motor, second switch means actuatable by said second cam means from an initially open position to a closed position when said first timer motor is energized, a second timer motor connected in circuit with said first and second switch means so as to be initially energized when said first and second switch means are closed, third switch means actuatable into open position when said first cam means is in said predetermined position and closed when said first cam means has been shifted from its predetermined position by rotation of said tube, a third cam means rotatable by said second timer motor, fourth switch means actuatable by said third cam means from an initially open position to a closed position for continuing to energize said first timer motor through said second switch means when said first switch means is open, said fourth switch means also continuing to cause said second timer motor to remain energized while said fourth switch means is closed, fourth cam means also rotatable by said second timer motor, fifth switch means actuatable by said fourth cam means from an initially closed position to an open position, said fourth cam means being angularly spaced relative said third cam means so as to cause said fifth switch means to open a predetermined time after said fourth cam means has been closed by said third cam means, said fourth cam means having means for allowing said fifth switch means to remain open for the desired dwell period to be imparted to said tube while at its charge-dumping position, and power supply means for said various switch means and said motor means, whereby an energizing electrical path is first established via said first, second, fourth and fifth switch means to cause operation of said motor means and then to said third and fifth switch means to cause continued operation of said motor means until said charge-dumping position is reached to cause resumption of the operation of said motor means after the dwell period provided by said fourth cam means and said fifth switch means to cause operation of said motor means to return said tube to its charge-receiving position, the return of said tube to its said charge-receiving position causing said first cam means to close said first switch means after said first timer motor has rotated said second cam means into a position to effect opening of said second switch means, the return of said tube to its said charge-receiving position also causing said first cam means to open said third switch means.

5. The apparatus as defined in claim 4, in which said power supply means includes a reversing switch for reversing the direction of rotation of said motor means and hence reverse the direction of rotation of said tube.

References Cited by the Examiner

UNITED STATES PATENTS

| | | | |
|---|---|---|---|
| 2,867,314 | 1/1959 | Hansen | 198—64 |
| 2,940,639 | 6/1960 | Winter | 119—51.11 XR |
| 3,026,845 | 3/1962 | Winter | 119—52 XR |
| 3,034,688 | 5/1962 | Rudd | 222—330 |
| 3,103,203 | 9/1963 | Haen | 119—59 |
| 3,111,115 | 11/1963 | Best | 119—52 |
| 3,112,732 | 12/1963 | Carson, Jr. | 119—52 |
| 3,155,286 | 11/1964 | Van Peursem | 119—56 XR |

SAMUEL KOREN, *Primary Examiner.*

ALDRICH F. MEDBERY, *Assistant Examiner.*